Aug. 18, 1970     D. B. HANCOCK     3,525,004

MAGNETIC DRIVE

Filed Jan. 24, 1968     2 Sheets-Sheet 1

*INVENTOR:*
DAVID B. HANCOCK

Aug. 18, 1970   D. B. HANCOCK   3,525,004
MAGNETIC DRIVE

Filed Jan. 24, 1968   2 Sheets-Sheet 2

United States Patent Office 3,525,004
Patented Aug. 18, 1970

3,525,004
MAGNETIC DRIVE
David B. Hancock, 127 W. 88th St.,
New York, N.Y. 10024
Filed Jan. 24, 1968, Ser. No. 700,290
Int. Cl. H02k 49/10
U.S. Cl. 310—103
8 Claims

ABSTRACT OF THE DISCLOSURE

The particular embodiment described herein as illustrative of one form of the invention utilizes a non-contacting, cylindrical, permanent magnet having radially extending projections forming pole pieces on each end of the cylinder, as a rotating non-contacting driving member for a phonograph turntable. The turntable has a plurality of corresponding projections radially disposed about the outer periphery thereof. The cylindrical magnet is disposed in very close proximity to the turntable projections and has its major axis parallel to the turntable axis so that positive rotation of the magnet causes the turntable to rotate in synchronism therewith.

---

This invention relates in general to magnetic drives and, more particularly, to improvements in permanent magnetic drives.

Heretofore, non-contacting, permanent magnet drives of the type used particularly to drive phonograph turntables, have utilized a plurality of rotating permanent magnets with adjacent poles of opposite polarity facing, but spaced from pole pieces forming driven elements mounted on a rotatable unit to be driven. As the magnets rotate, the driven elements move to reduce the reluctance of the magnetic path, thereby causing the driven unit to rotate. However, such drives require a large number of discrete permanent magnets, and when in operation, present magnetic poles of constantly changing polarity to the pole pieces, thereby producing a fluctuating magnetic field which must be shielded from nearby magnetic transducer devices.

An object of this invention is to provide a simpler, less costly and more easily manufactured magnetic drive suitable for phonograph turntables and the like.

Another object of this invention is to provide a more satisfactory sound equipment turntable which may be driven throughout its life at a more constant desired speed without fluctuation.

A further object of this invention is to provide a more satisfactory drive for sound equipment turntable which will not generate any mechanical noise which may be transmitted to a pickup.

Yet another object of this invention is to provide a magnetic drive for sound equipment and the like which will not produce a fluctuating magnetic field and will require only minimum shielding from a magnetic pickup.

A still further object of this invention is to provide an extremely simple sound equipment turntable which is superior in its function to any yet available.

Many other objects, advantages and features of invention reside in the particular construction, combination and arrangement of parts involved in the embodiment of my invention and its practice otherwise as will be understood from the following description and accompanying drawing wherein.

Figure 1:
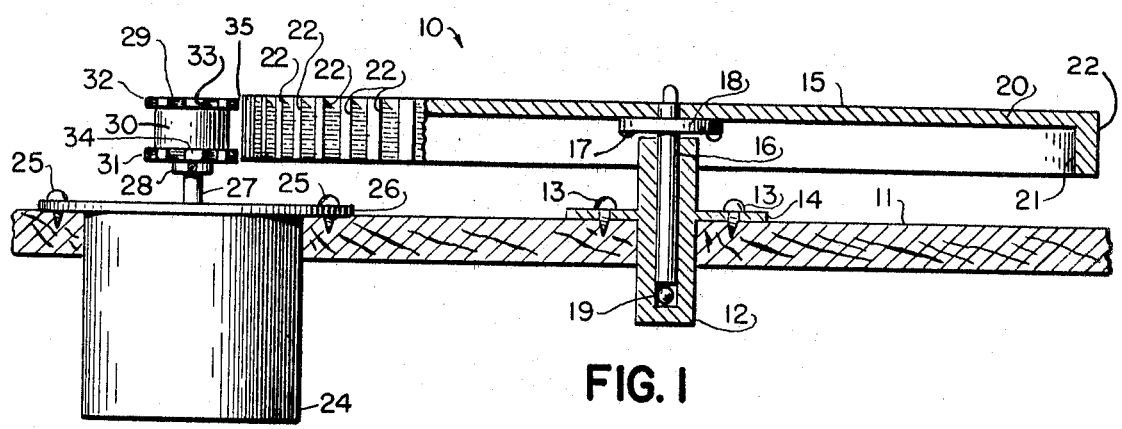
FIG. 1 is a vertical section through a sound equipment turntable assembly according to my invention.

Referring to FIG. 1 of the drawing in detail, the turntable assembly of the invention is generally designated by the reference numeral 10. A horizontal mounting board 11 has a turntable support 12 set therein and fixed in place by means of screws 13 which pass through a flange 14 of the support 12.

A turntable 15, formed from a suitable material such as cast iron or aluminum has a downwardly extending central support shaft 16, attached thereto by means of the screws 17 which pass through a flange 18 secured to shaft 16. Shaft 16 rests on a suitable low friction bearing such as ball bearing 19 to allow the free rotation of turntable 15. Turntable 15 has a top web 20 and a peripheral flange 21 which may be detachable and which is formed from a magnetic material of good permeability, such as iron. If desired, turntable 15 may be formed entirely of such material, with flange 21 as an integral part thereof. Vertical, transverse, evenly spaced projections 22, disposed on the outer periphery of flange 21, are tapered outwardly to form a serrated edge configuration.

Also mounted in board 11 is a synchronous motor 24 which is held in place by means of screws 25, passing through a mounting flange 26. Shaft 27 projects upward from motor 24 and has a collar 28 secured to its upper end. A driver unit 29, attached to collar 28 comprises a cylindrical permanent magnet 30, positioned between a pair of magnetic pole pieces 31, 32. Shaft 27 and collar 28 are preferably formed from non-magnetic material to prevent the establishment of an unwanted magnetic path for flux emanating from magnet 30.

Figure 2:
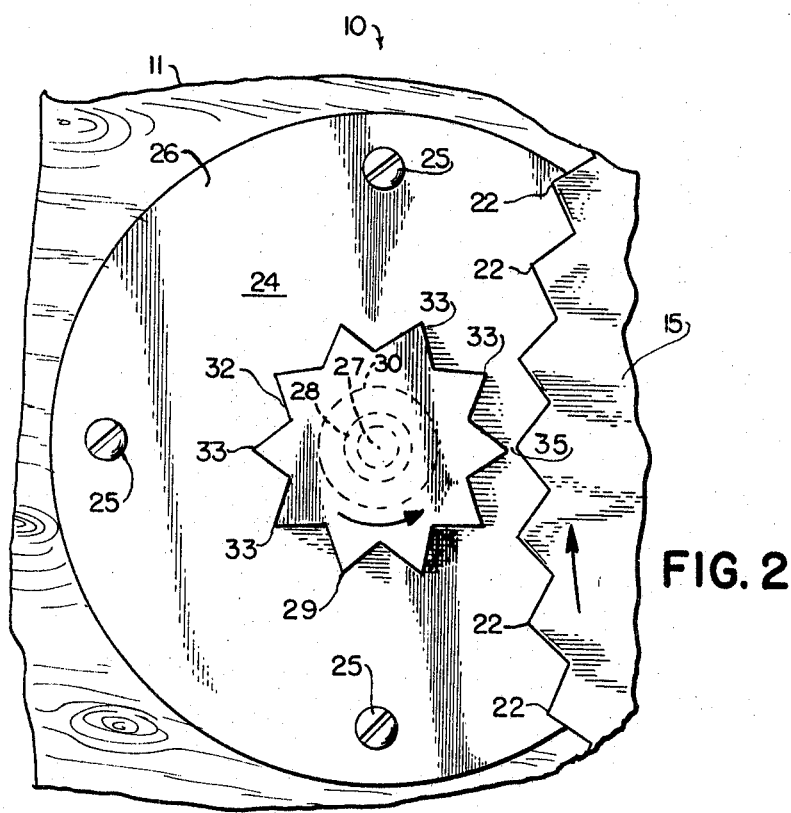
FIG. 2 is a plan view of a fragment of the turntable assembly of FIG. 1 showing the motor, the driver, and a fragment of the turntable.
Figure 3:
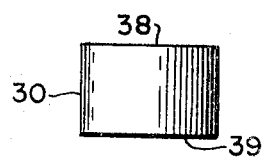
FIG. 3 is a side view of the permanent magnet of the driver with the top and bottom pole pieces removed.

Each pole piece 31, 32 (FIG. 2) has a group of respective projections 33, 34 with each projection extending radially outward therefrom in a tapered configuration. Collectively, each group of projections forms a serrated edge configuration, generally similar to projections 22 on flange 21. Magnet 30 is suitably dimensioned in axial length so that each group of projections 33, 34 is positioned near the upper and lower ends respectively, of projections 22. The spacing between adjacent ones of projections 33 and adjacent ones of projections 34 is substantially the same as the spacing between adjacent ones of projections 22 on turntable 15. Pole pieces 31, 32 are affixed to magnet 30 with projections 33, 34 in vertical register with each other. If desired, pole pieces 31, 32 may be integrally formed with magnet 30, as by machining suitable magnetic material to the preferred configuration.

When the extreme outer ends of a corresponding pair of spaced projections 33, 34 are aligned with the extreme outer end or apex of a tapered projection 22 of turntable 15, an air gap 35 is established therebetween. Driver unit 29 is mounted in close proximity to turntable flange 21 to minimize the width of air gap 35. However, too small an air gap, while providing good magnetic coupling between projections 33, 34 and 22, may transmit vibration to turntable 15. Therefore, the air gap 35 should be adjusted to a width which will reduce such vibration to a minimum, but which will still provide sufficient magnetic coupling to drive turntable 15. In one example of the invention, air gap 35 exceeded .02 in.

In operation, turntable 15 may have to be hand rotated or spun after starting motor 24 to lock its projections 22 into synchronous speed with the projections 33 and 34 of the pole pieces 31 and 32. The starting torque of motor 24 and the mass of turntable 15 will determine whether hand starting of the turntable 15 is required. Since the top surface 38 of magnet 30 is one pole and the bottom surface 39 is another pole of opposite polarity, magnetic lines of force will tend to draw or pull corresponding projections 22 along with pairs of projections 33 and 34 to minimize air gap 35, as magnetic circuits are formed with lines of flux passing between the pairs of projections 33 and 34 through the air gaps 35 and the projections 22.

The ratio of the velocities in r.p.m. of turntable 15 and driver 29 is proportional to the ratio of the number of teeth of pole pieces 31, 32 and flange 21. Thus, in the example of the invention mentioned above, a 300 r.p.m. synchronous motor 24 rotates a driver 29, with pole pieces 31 and 32 each having sixteen projections 33, 34. The flange 21 of turntable 15 is formed with 144 projections 22 and is therefore driven at 33⅓ r.p.m. In another arrangement, pole pieces 20, 22 each had 20 projections 33, 34 respectively, and flange 21 had 360 projections. Driver 29 was rotated at 600 r.p.m. so that turntable 15 rotated at 33⅓ r.p.m.

If manual starting of turntable 15 is not desired, then by selecting a motor 24 having a low starting torque and connecting the motor to a source of power through a conventional A.C. voltage varying device such as a variable auto-transformer, or any other suitable, low speed motor starting circuit, the turntable 15 may be brought up to speed merely by varying the input voltage to motor 24.

A simple electro-mechanical automatic starting arrangement may be provided by pivotally mounting motor 24 in a loose manner such that it is free to rotate slightly about a peripheral pivot point, such as one of screws 25, towards the axis 16 of turntable 15 to bring pole piece projections 33, 34 momentarily into contact with turntable projections 22. A conventional solenoid of the time delay type may be linked to motor 24 to cause the desired pivotal movement thereof at the instant of energization. Upon expiration of a selected time delay sufficient to allow turntable 15 to be brought up to speed, the solenoid may then be automatically de-energized, allowing motor 24 to return under the urging of a suitably positioned spring, to the operating position as shown in FIG. 1.

Figure 4:
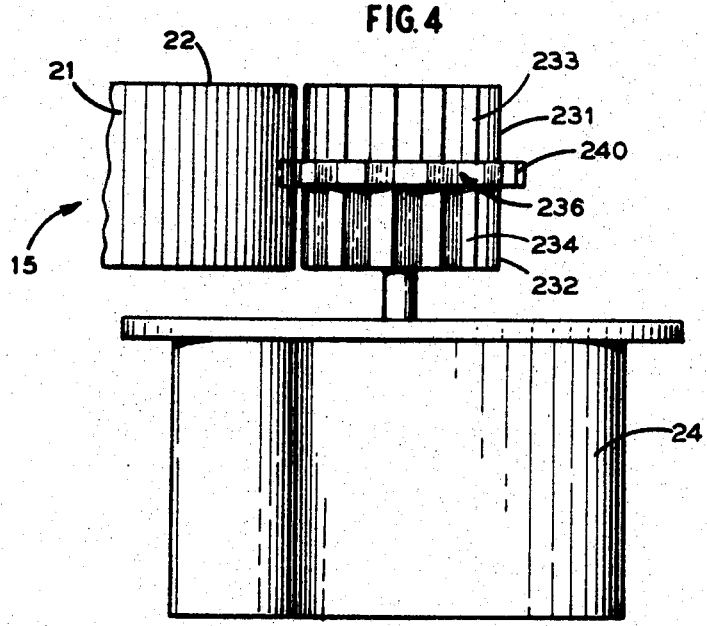
FIG. 4 is a side elevation of another embodiment of the driver of the present invention.
Figure 5:
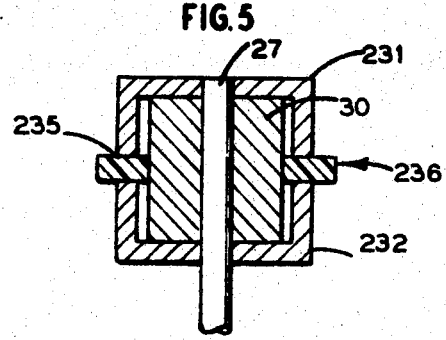
FIG. 5 is a cross-section of the magnet and pole piece assembly of FIG. 4.
Figure 6:
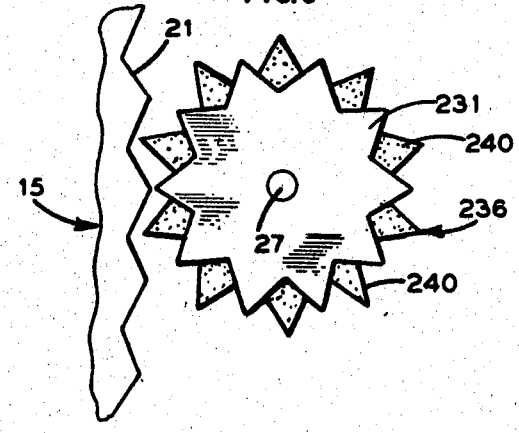
FIG. 6 is a plan view of the magnetic drive elements of FIG. 4.

Another embodiment of the invention is shown in FIGS. 4–6 wherein permanent magnet 30, mounted on a non-magnetic shaft 27 and driven as before by motor 24, has cup shaped pole pieces 231, 232 each respectively secured to a pole thereof and in axial, concentric alignment with shaft 27. Pole pieces 231, 232 have serrated side walls 233, 234 respectively extending towards each other, with the mouths of each cup separated by an air gap 235. In this embodiment of the invention, the magnetic flux is concentrated near the central portion of the periphery of the driven member such as flange 21 of turntable 15, thereby providing ample magnetic driving force without the need for close parallel alignment between the axis of shaft 27 and the axis of the driven member.

To insure positive starting of the driven member such as turntable 15, a serrated annular ring 236 made of a non-magnetic material such as a suitable plastic, may be mounted in the air gap 235 between the mouths or open ends of cup shaped pole pieces 231, 232. The serrated projections 240 of ring 236 preferably have the same number of serrations as those of pole pieces 231, 232, but have a smaller included angle and are positioned so as to be "out-of-phase" with the serrations of side walls 233, 234. Projections 240 have sufficient length to engage with corresponding projections in the driven member, such as projections 22 of flange 21. Thus, upon energization of motor 24, projections 240 make physical contact with projections 22, thereby urging turntable 15 to rotate therewith.

When motor 24 and turntable 15 reach synchronous speed, projections 240 cease to engage projections 22 but instead rotate in spaced relation therewith, so there is no longer any physical contact between annular ring 236 and flange 21.

While this invention has been shown and described as a turntable drive, it may be used as a low torque drive for many other applications. The embodiments shown could be modified in many ways. The driver 29 could be disposed within the flange or rim 21 of turntable 15 below web 20. The projections 22 would then be formed to extend inward from flange 21. The pole pieces, of magnetic material such as iron, may be soldered, glued, or otherwise fixed to the poles of magnet 30 and collar 28, and the tapered projections need not be a pure serrated shape.

This invention enjoys many advantages. Since a single magnet 30 is rotated about an axis which extends through its poles, only negligible magnetic fluctuations are set up to interfere with a magnetic pickup or other magnetic field responsive device. Further, its driven speed is absolutely constant and the drive itself will last indefinitely. Also, since only one magnet 30 is required, the drive may be cheaply made while providing superior characteristics.

While this invention has been described in the best form known to me, it will nevertheless be understood that this is purely exemplary and that modifications may be made without departing from the spirit and scope of my invention except as it may be more limited in the appended claims wherein I claim:

1. A magnetic drive comprising, in combination, a driver having a permanent magnet with ends defining the poles thereof, said magnet being mounted to rotate about an axis passing through said poles, said poles having a plurality of first circumferential radial projections; driving means for rotating said magnet; and a rotatably mounted, circular driven member disposed adjacent to said driver, said circular driven member having an outer periphery including a plurality of second circumferential radial projections integrally formed of magnetic material, said radial projections being spaced apart from each other a distance substantially equal to the distance between adjacent projections of said poles, at least one of the projections of said poles and at least one of the projections of said driven member facing each other to form an air gap therebetween, said permanent magnet, corresponding projections of said poles, said air gap, and said projections of said driven member forming a magnetic circuit enabling said driver to drive said driven member.

2. The combination according to claim 1 wherein the facing projections of said poles and said driven member are outwardly tapered in a radial direction to converge towards each other.

3. The combination according to claim 2 wherein said projections have a serrated configuration.

4. The combination according to claim 1 wherein discrete pole pieces of magnetic material are affixed to the ends of said magnet and said first circumferential radial projections are formed in each of said pole pieces.

5. The combination according to claim 1 wherein each plurality of projections of each of said poles is disposed near an end of said second plurality of circumferential radial projections of said driven member.

6. The combination according to claim 4 wherein each of said pole pieces has a cup shaped configuration surrounding an end of said magnet, the bottom of each cup abutting a respective end of said magnet and said first circumferential radial projections also extending longitudinally and parallel to the polar axis of said magnet to form the sides of each of said cups, the mouths of said cups facing one another to form an airgap therebetween.

7. The combination according to claim 6 including a non-magnetic annular ring disposed in said airgap between the mouths of said gaps, said ring having a plurality of third radial projections extending outwardly beyond said first circumferential radial projections to engage with said second circumferential radial projections to facilitate the initial starting of said driven member.

8. The combination according to claim 7 wherein said first and third projections are radially displaced from each other such that said third projections engage with siad second projections during an initial starting period of said driving member and disengage with said second projections after said driven member has reached normal operating speed.

References Cited

UNITED STATES PATENTS

| | | | |
|---|---|---|---|
| 2,436,939 | 3/1948 | Schug | 310—103 |
| 2,563,567 | 8/1951 | Wakefield | 310—104 X |
| 2,711,306 | 6/1955 | Levi | 310—104 X |
| 3,223,865 | 12/1965 | Gladstone | 310—103 |
| 3,375,383 | 3/1968 | Philbrick | 310—103 |

FOREIGN PATENTS 984,344  2/1951  France.

DAVID X. SLINEY, Primary Examiner